(12) United States Patent
Lee

(10) Patent No.: US 8,458,394 B2
(45) Date of Patent: Jun. 4, 2013

(54) STORAGE DEVICE AND METHOD OF MANAGING A BUFFER MEMORY OF THE STORAGE DEVICE

(75) Inventor: Jae Don Lee, Paju-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 610 days.

(21) Appl. No.: 12/567,778

(22) Filed: Sep. 27, 2009

(65) Prior Publication Data

US 2010/0241792 A1 Sep. 23, 2010

(30) Foreign Application Priority Data

Mar. 18, 2009 (KR) .................. 10-2009-0023041

(51) Int. Cl.
*G06F 12/02* (2006.01)

(52) U.S. Cl.
USPC ........................................ 711/103

(58) Field of Classification Search
None
See application file for complete search history.

(56) References Cited

U.S. PATENT DOCUMENTS

| | | | |
|---|---|---|---|
| 6,721,843 B1 * | 4/2004 | Estakhri | 711/103 |
| 7,461,199 B2 * | 12/2008 | Conley et al. | 711/103 |
| 2003/0145012 A1 * | 7/2003 | Kurth | 707/100 |
| 2003/0163629 A1 * | 8/2003 | Conley et al. | 711/103 |
| 2006/0294330 A1 * | 12/2006 | Stanfill | 711/159 |
| 2007/0101075 A1 | 5/2007 | Jeddeloh | |
| 2007/0288688 A1 * | 12/2007 | Kang | 711/103 |
| 2008/0049520 A1 * | 2/2008 | Kang et al. | 365/185.33 |
| 2008/0147968 A1 * | 6/2008 | Lee et al. | 711/103 |
| 2009/0055579 A1 * | 2/2009 | Park et al. | 711/103 |
| 2009/0165020 A1 * | 6/2009 | Allen et al. | 719/314 |
| 2009/0172263 A1 * | 7/2009 | Olbrich et al. | 711/103 |
| 2010/0125695 A1 * | 5/2010 | Wu et al. | 711/103 |
| 2010/0332741 A1 * | 12/2010 | Cornwell et al. | 711/103 |
| 2012/0239852 A1 * | 9/2012 | Calvert et al. | 711/103 |

FOREIGN PATENT DOCUMENTS

| | | |
|---|---|---|
| JP | 2004-071033 | 3/2004 |
| JP | 2007-066119 | 3/2007 |
| KR | 1020030045599 | 6/2003 |
| KR | 1020080017982 | 2/2008 |

\* cited by examiner

*Primary Examiner* — Kaushikkumar Patel
(74) *Attorney, Agent, or Firm* — NSIP Law

(57) ABSTRACT

A storage device including a processor to transmit N pages of data from one or more pages in a buffer memory where N is a natural number. The storage device also includes a flash memory to program in parallel the N pages of data to N flash chips. The N pages may be transmitted via one or more channels.

15 Claims, 5 Drawing Sheets

STORAGE DEVICE AND METHOD OF MANAGING A BUFFER MEMORY OF THE STORAGE DEVICE

CROSS-REFERENCE TO RELATED APPLICATION

This application claims the benefit under 35 U.S.C. §119(a) of a Korean Patent Application No. 10-2009-0023041, filed on Mar. 18, 2008, in the Korean Intellectual Property Office, the entire disclosure of which is incorporated herein by reference in its entirety for all purposes.

BACKGROUND

1. Field

The following description relates to a storage device and a buffer memory management method of a storage device that may be used with a buffer memory.

2. Description of Related Art

A buffer memory compensates for differences in the operation speed of different devices, for example, a signal processor, a random access memory (RAM), a cache memory, or a read only memory (ROM). In many computing environments, information may be passed from one device to another to perform computing tasks, such as processing, storage, or communication. Such information may include processes, data, functions, or any other information that consumes computing resources. Information may be sent in packet form or in some other type of data stream in various applications. Each data access is associated with a separate call to memory. As described herein, accessing data includes writing data, reading data, and the like. When a high speed device and a slow speed device access data, latency may be introduced. This latency may be reduced by utilizing an appropriately sized buffer memory.

Examples of a buffer memory include a cache memory that compensates for a difference in speed between a central processing unit (CPU) and a memory, a buffer memory that compensates for a difference in speed between a host and a storage device, and the like.

The cost of buffer memory is often greater than the cost of other memory types, for example, RAM and Rom. Because the cost of increasing the size of buffer memory is relatively high compared with an increase of a processing speed, oftentimes a buffer memory having a relatively small capacity is used regardless of the speed of a corresponding processor. For example, a size of a buffer memory of a commonly used hard disk (HDD) may be about 4 MB to 32 MB. Accordingly, the volume of data that is able to be stored in a buffer in advance is relatively small when compared to the volume of data that may be stored in a RAM drive that may contain, for example, 40 GB to 250 GB of storage.

SUMMARY

Described herein is a storage device and a buffer management method that may be used with a buffer memory.

In one aspect, a storage device comprising a buffer memory including one or more pages of data, a flash memory to program in parallel the N pages of data to flash chips, one or more channels between the buffer memory and the flash memory, and a processor to transmit the N pages of data from the one or more pages of data in the buffer memory to the flash memory, via the one or more channels, wherein N is a natural number.

The processor may transmit the N pages of data when a number of empty pages in the buffer memory is less than or equal to a first threshold. The processor may erase the N pages of data from the buffer memory after transmitting the N pages of data to the flash memory. The flash memory may program in parallel the N pages of data to the N flash chips.

Each page among the one or more pages of data in the buffer memory may be associated with any one of N buffer queues. The processor may select pages respectively associated with N buffer queues and transmit the selected N pages of data to the flash memory when a number of empty pages in the buffer memory is less than or equal to the first threshold.

The processor may select the pages respectively associated with the N buffer queues based on a least recently used (LRU) scheme.

In another aspect, a storage device, comprising a buffer memory including N buffer queues, where N is a natural number, a flash memory including one or more flash chips configured to program in parallel data to the one or more flash chips, and a processor to select pages respectively from at least two buffer queues of the N buffer queues and to transmit data stored in the selected pages to the flash memory in parallel.

The number of buffer queues, N, may be determined according to a number of channels used to program in parallel the data in the flash memory. The processor may select the pages from the at least two of the N buffer queues and transmit the data stored in the selected pages when a number of empty pages in the buffer memory is less than or equal to a first threshold. The processor may select the pages from the at least two buffer queues based on an LRU scheme.

In another aspect, provided is a method of managing a buffer, the method comprising selecting pages respectively from at least two buffer queues of a plurality of buffer queues in the buffer, transmitting data stored in the selected pages to the flash memory, and programming in parallel the transmitted data to one or more flash chips.

The transmitting may comprise determining no empty page exists in the buffer memory when accessing data not stored in the buffer memory.

The method may further comprise erasing data stored in the selected pages. The method may further comprise writing data corresponding to a received write command on any one of the pages where the data has been erased. The method may further comprise allocating the any one page to a buffer queue corresponding to the any one page.

The method may further comprise updating an arrangement sequence in the buffer queue corresponding to the any one page.

In another aspect, a computer readable recording media storing a program including instructions to cause a computer to select pages respectively from at least two buffer queues of a plurality of buffer queues in a buffer, transmit data stored in the selected pages to the flash memory, and program in parallel the transmitted data to one or more flash chips of the flash memory.

Other features and aspects will be apparent from the following detailed description, the drawings, and the claims.

BRIEF DESCRIPTION OF THE DRAWINGS

Throughout the drawings and the detailed description, unless otherwise described, the same drawing reference numerals to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses, and/or methods described herein will be suggested to those of ordinary skill in the art. Also, descriptions of well-known functions and constructions may be omitted for increased clarity and conciseness.

Figure 1:
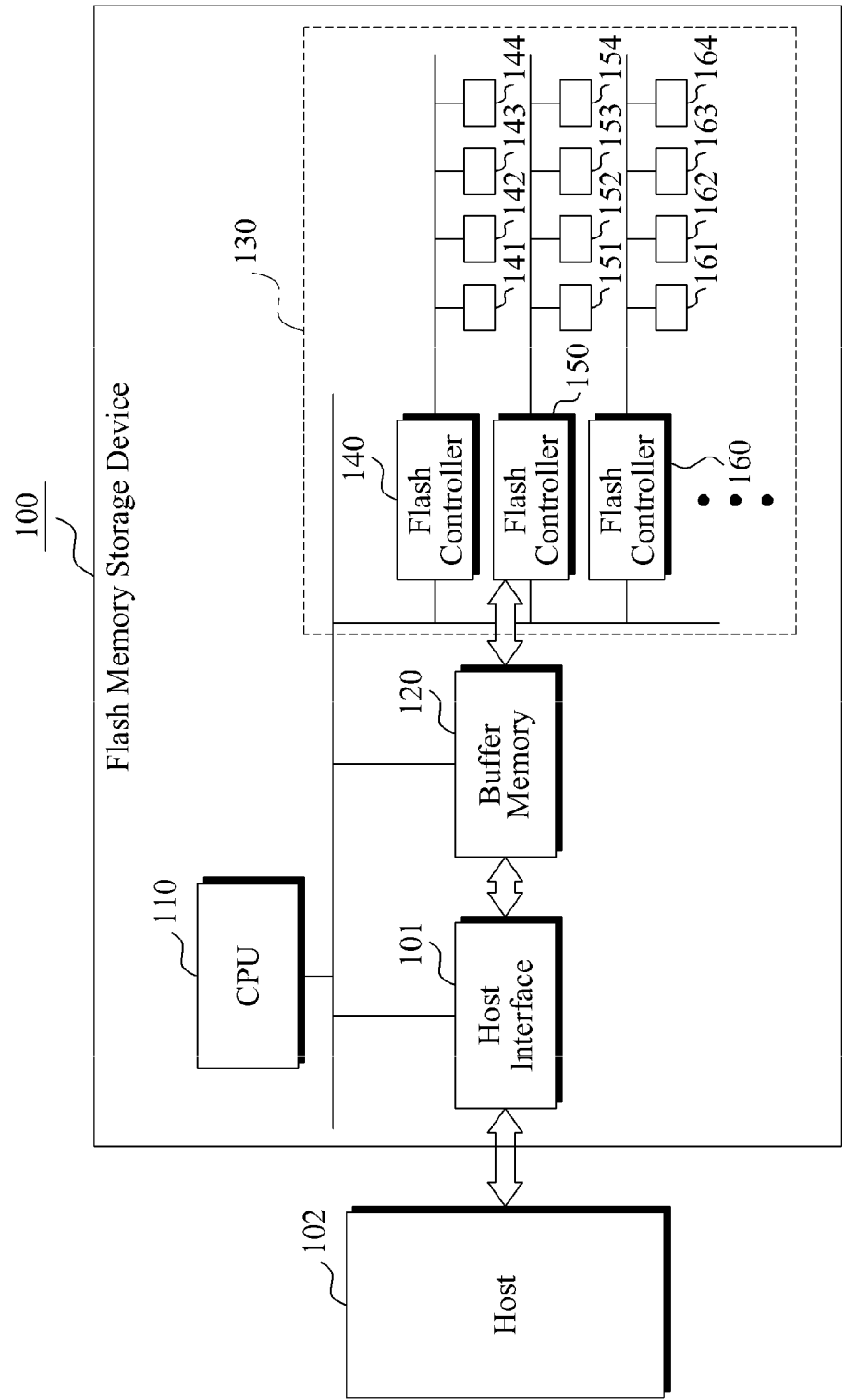
FIG. 1 illustrates an example of a storage device.

FIG. 1 illustrates an example of a storage device 100. According to this example, the storage device 100 may include a CPU 110, a buffer memory 120, and a flash memory 130. In one example the storage device 100 may be a solid state disk (SSD) that includes a flash memory. The SSD may embody a storage having a large capacity by using a plurality of flash memory chips.

The storage device 100 may receive a data access command, such as a read command, a write command, and the like, from a host 102, via a host interface 101. The host interface 101 may implement a communication standard, such as a parallel advanced technology attachment (PATA) scheme, a serial ATA (SATA) scheme, a universal serial bus (USB) scheme, and the like. The host 102 may be any electronic device, for example, a personal computer, a laptop, a digital camcorder, a digital camera, and the like.

The CPU 110 of the storage device 100 may control communication with the host 102 and may control one or more parts of the storage device 100. The CPU 110 may be operated using various programs, for example, a drive operation system (OS), firmware, a real time OS, and the like.

Using buffer memory management, the CPU 110 may directly control writing, storing, and/or erasing of data with respect to the buffer memory 120 or the flash memory 130.

However, the buffer memory management process may be performed by controlling devices, other than the CPU 110, that control the buffer memory or the flash memory, such as flash controllers 140, 150, and 160 of each channel of the flash memory 130, as illustrated in FIG. 1. For example, a separate controlling module (not illustrated) may be included in the storage device 100.

The buffer memory 120 may temporarily store or buffer partial data of the flash memory 130. The CPU 110 may enable the host 102 to access the buffered data.

The buffer memory 120 may be a volatile memory, such as a dynamic RAM (DRAM) and/or a static RAM (SRAM). In addition the buffer memory 120 also may be a nonvolatile (NV) memory, for example, a NVRAM.

Also, the flash memory 130 also may be implemented using a NAND flash memory or a NOR flash memory. An exemplary flash memory may use a multi-channel, multi-way scheme.

The flash memory 130 may include a plurality of channels to provide parallel data access of the flash chips 141, 142, 143, 144, 151, 152, 153, 154, 161, 162, 163, and 164. For example, each channel of the flash memory 130 may include a flash controller 140, 150, 160, or the like, that is engaged in data access.

The flash memory 130 may include a group of a plurality of memory chips that access data in parallel in a single channel. This scheme may be referred to as a multi-data way or a multi-way scheme.

The flash memory of FIG. 1 also may use the multi-channel, multi-way scheme.

FIG. 1 illustrates one example where the flash memory 130 is used as a main storage storing data; however, FIG. 1 is only one example and the main storage device is not limited to implementation by a flash memory.

For example, the main storage may be implemented using other memory devices having a multiple channels. One skilled in the art would be able to replace the flash memory 130 with other storage media without departing from the principles and spirit of the buffer management method described herein.

An exemplary procedure of buffer management processing the memory device is described with reference to FIGS. 2, 3, 4, and 5.

Figure 2:
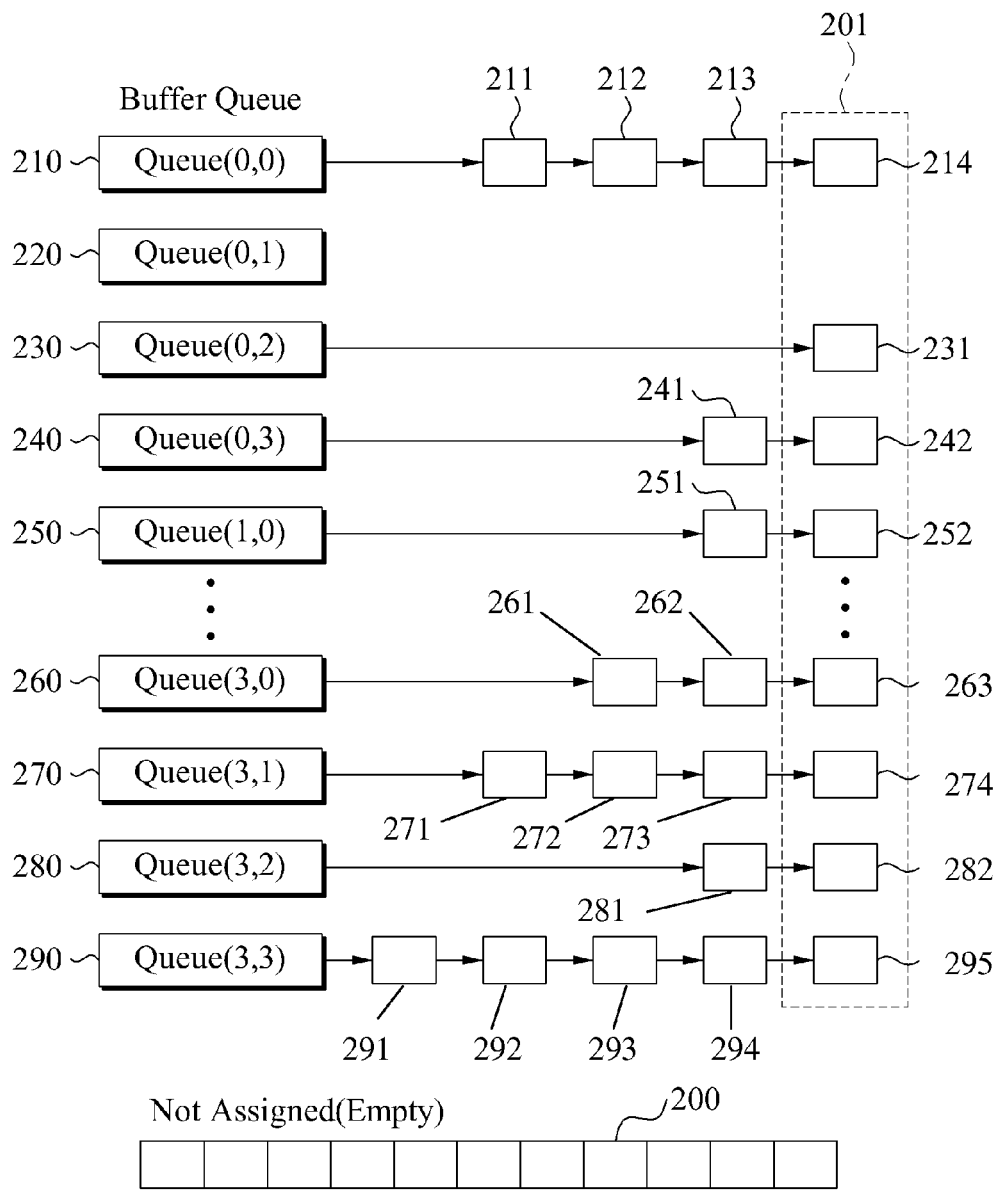
FIG. 2 illustrates an example of a buffer queue that may be used to manage buffer pages in a storage device.

FIG. 2 illustrates an example of a buffer queue that may be used to manage buffer pages in a storage device.

The buffer memory 120 may include a plurality of buffer pages, for example, buffer pages 211, 212, 213, and 214. Each of the plurality of buffer pages may perform buffering of data of a flash memory 130.

The page buffers that currently store data in the buffer memory 120 may be associated with any one of a plurality of buffer queues, for example, queues 210, 220, 230, 240, 250, 260, 270, 280, and 290.

A queue may be one type of data structure. A scheme of enabling data to be included in, or to be associated with, the queue may be referred to as inqueue, and a scheme of deleting the relation between the queue and the data associated with the queue may be referred to as dequeue.

When any one buffer page in the buffer memory 120 stores data, the processor 110 may inqueue the buffer page in any one of the buffer queues 210 through 290.

Figure 3:
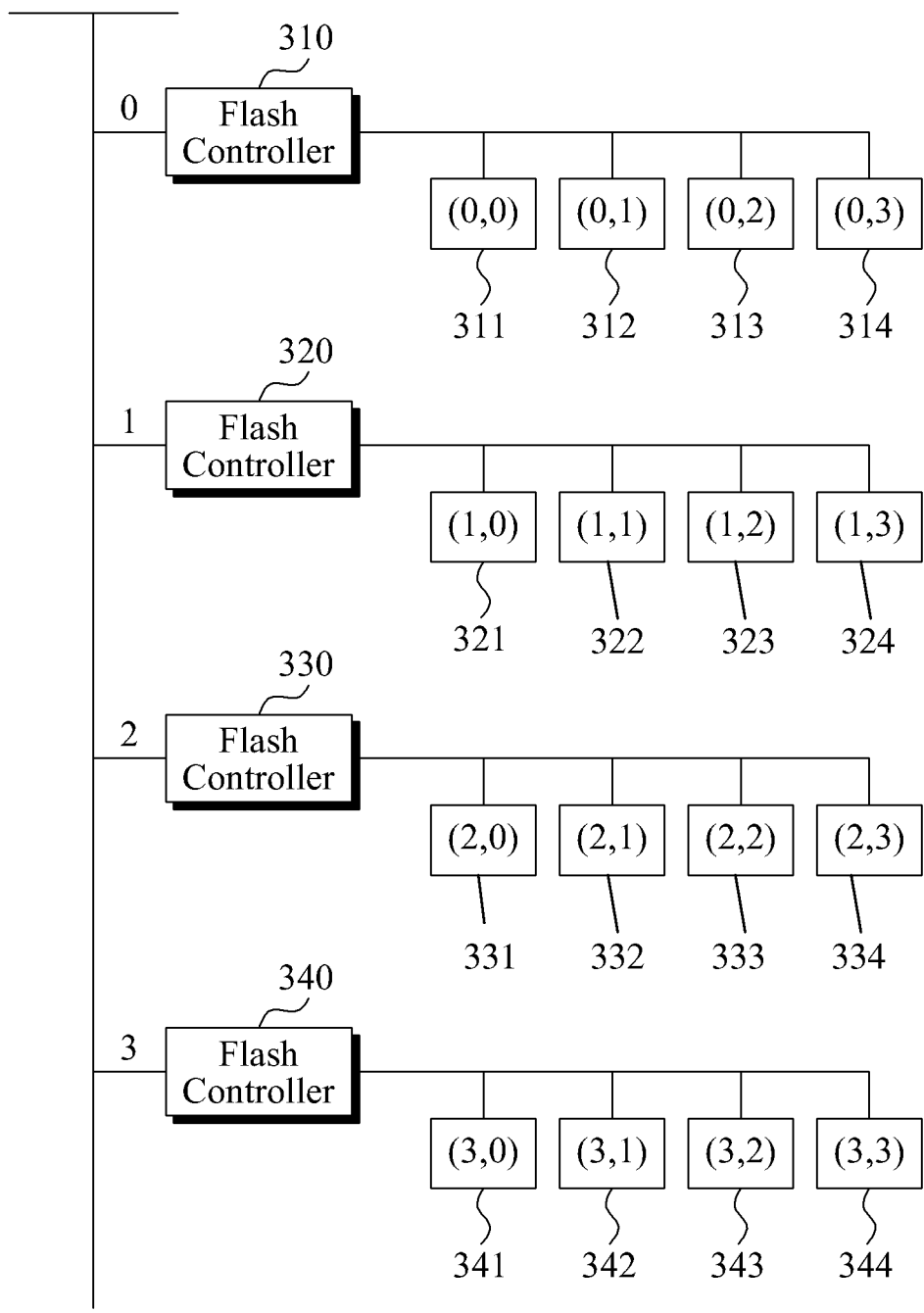
FIG. 3 is an example of a multi-channel multi-way flash memory that may communicate with the buffer queue of FIG. 2.

A multi-channel, multi-way flash memory respectively corresponding to the buffer queue 210 through 290, is illustrated in FIG. 3.

In FIG. 3, the flash memory may include one or more channels, for example, four channels (i.e., channel 0, channel 1, channel 2, and channel 3). Each channel may include data ways corresponding to one or more flash chips. For example, each channel may include four data ways.

In the example shown in FIG. 3, sixteen data ways (e.g., 311, 312, 313, 314, 321, 322, 323, 324, 331, 332, 333, 334, 341, 342, 343, 344), or flash chips, may exist in the flash memory of FIG. 3. However, the number of flash chips is exemplary and not limited to sixteen. The data access, such as data programming, may be performed in parallel through each of the sixteen data ways in the flash memory.

As an example, data programming performed in each of sixteen pages illustrated in FIG. 3 may be processed in parallel, the sixteen pages being respectively included in sixteen data ways.

Referring again to FIG. 2, the buffer queues 210 through 240 may respectively correspond to four data ways, for example, 311 through 314 that are be capable of performing parallel data access in the channel 0 of FIG. 3.

Buffer pages 211 through 214 that perform buffering of flash pages at channel 0 and a data way 0, for example, at data way 311, may be inqueued in Queue (0, 0) 210.

However, in this example an inqueued page does not exist in Queue (0, 1) 220, because a page at channel 0 and a data way 1, for example, data way 312, is not buffered in the buffer memory 120.

In the same manner, a buffer page 231 that performs buffering of a flash page at channel 0 and a data way 2, for example, at data way 313, may be inqueued in Queue (0, 2) 230.

According to examplary embodiments described herein, one or more buffer pages inqueued in a queue may be arranged by a dequeue sequence.

In a queue structure, a policy of determining the dequeue sequence of inqueued data may play an important role in an operation rate and/or efficiency of the buffer. For example, when a list of buffered pages in the buffer memory may be managed by using a queue, the dequeue sequence of the inqueued buffer pages may be directly associated with a buffer replacement sequence.

A buffer hit may refer to when data of a page to be accessed is buffered in the buffer memory, and a buffer miss may refer to when the data of the page to be accessed is not buffered in the buffer memory.

The buffer memory 120 may be used to increase data access speed by increasing a probability of a buffer hit. Accordingly, a dequeue sequence of one or more buffer pages in each of the buffer queues 210 through 260 in the buffer memory 120, may be adjusted to increase the probability of a buffer hit.

When free space in the buffer does not exist, data of an existing buffered page may be programmed to the flash memory, and the buffer page may be erased. This operation is referred to as a buffer replacement.

In the case of the buffer replacement, a buffer replacement policy refers to a criterion for determining which data of a page among existing buffered pages is to be written to the non-buffer memory.

As an example of the buffer replacement policy, there is a first-in first-out (FIFO) algorithm may be used. The FIFO algorithm is a method of deleting data based on data that was sequentially first stored. The FIFO algorithm does not consider whether the data is used in the future, but only considers the sequence of data that is stored in the buffer. Another general method that may be used for buffer replacement is a least recently used (LRU) algorithm. The LRU algorithm is a method of deleting data that has the greatest amount of time elapsed since a host referred to the data. An LRU algorithm is harder to implement than the FIFO algorithm.

Another method of buffer replacement only retains data that is required to be accessed in a near future. Data that is not to be accessed in the near future may be deleted.

In one example, the dequeue sequence of a buffer queue used for the buffer replacement may be arranged based on the LRU scheme.

For example, in a case of the buffer queue 210, pages 211 through 214 may be arranged in a sequence of pages that are most recently accessed, where the page 211 is the most recently accessed page, and the page 214 is the least recently accessed page.

When the LRU scheme is applied according to this example, the page to be dequeued first from the pages 211 through 214 is the page 214.

Conventional buffer management may manage a list of buffered flash pages in the buffer memory 120 as a whole and does not consider a channel or a data way of the buffered flash pages in the flash memory.

However, according to the examples provided herein, buffer management may classify and manage the buffered pages according to the data way in the flash memory. For example, the buffer pages 211 through 214 that buffer the flash memory pages of the data way 311 may be managed by using the buffer queue 210, and the buffer page 231 that buffers a page of the data way 313 may be managed using another buffer queue 230. According to this example, the buffer page 214 and the buffer page 231 may be programmed in parallel to the flash memory.

According to one example, when the number of empty buffer pages 200 is less than or equal to a first threshold of the buffer memory 120, or when an empty buffer page does not exist, a portion of the buffer memory 120 may be flushed and an empty buffer page may be generated.

A portion of the buffer pages in the buffer memory 120 may be stored in corresponding flash pages and the portion of the buffer pages may then be erased. This operation is referred to as a buffer flush.

According to one example, when the buffer flush is performed, tail buffer pages 201 of the buffer queues 210 through 290 may be flushed together. In addition, the data of the tail buffer pages 201 may be programmed in parallel to the flash memory. For example, when the buffer flush is performed, the processor 110 may select the tail buffer pages 201 of the buffer queues in the buffer memory 120. The processor 110 may transmit the data stored in the selected tail buffer pages 201 to the flash memory.

For example, the buffer page 214 may be programmed to a flash page that corresponds to the buffer page 214, through the data way 311.

In parallel with the programming of buffer page 214, the buffer page 231 also may be programmed to a flash page corresponding to the buffer page 231 through the data way 313.

In parallel with the programming of buffer pages 214 and 231, the buffer page 242 may be programmed to a flash page corresponding to the buffer page 242 through the data way 314.

In the same manner, buffer pages 252, 263, 274, 282, 295 also may be respectively programmed in parallel to corresponding flash pages through different data ways 321, 341, 343, and 344.

A buffer queue that has no inqueued buffer page, for example, the buffer queue 220, may not have a tail buffer page. As a result, the corresponding data way, for example, the data way 312, is in an idle state during the parallel programming operation of the flash memory.

Using the described parallel buffer flushing method, the speed of the flushing may be dramatically improved as compared with the speed of flushing a buffer page into a flash page one by one.

All the buffer pages 201 may be erased after or at the same time of the parallel programming. The erased pages 201 may provide an empty buffer queue 200.

Figure 4:
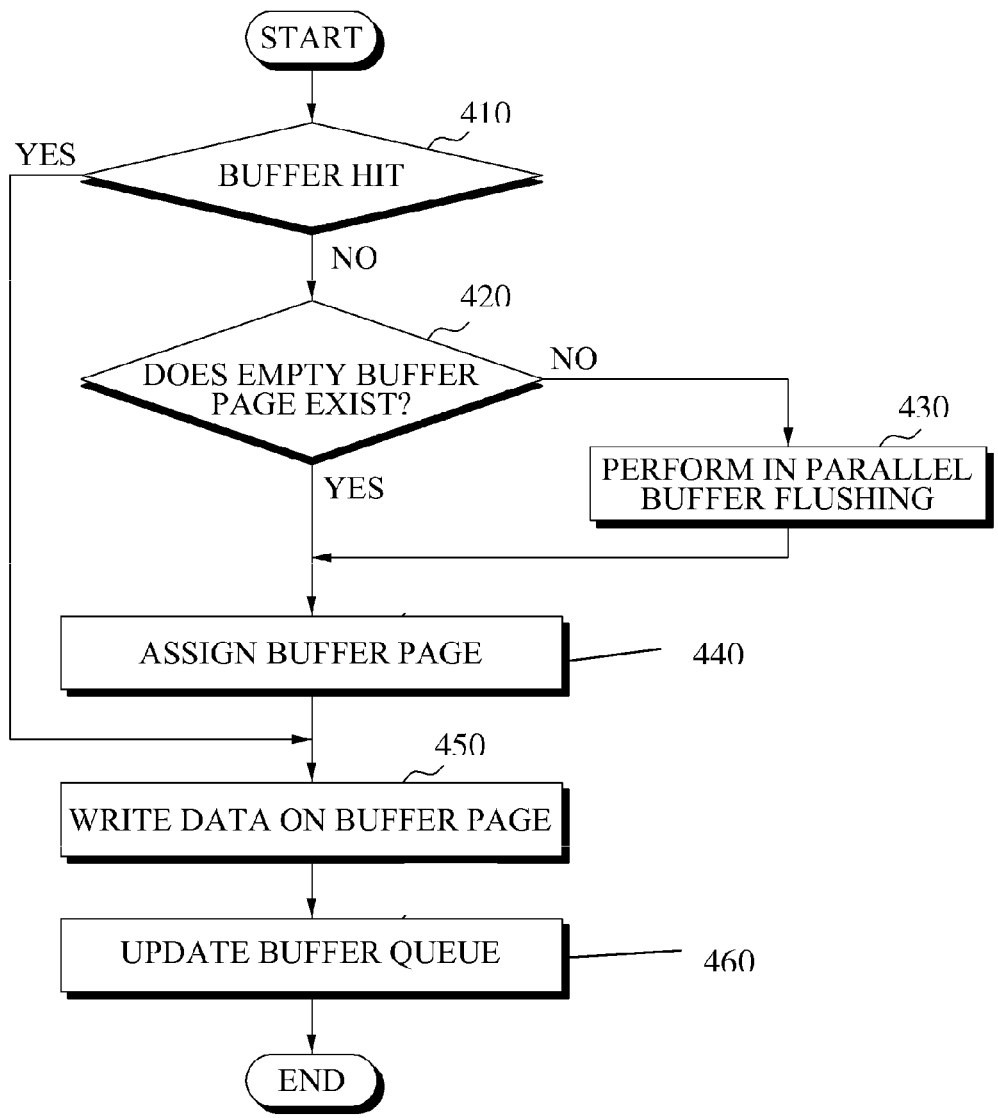
FIG. 4 illustrates an example of a method of managing a buffer.

FIG. 4 illustrates an example of a method of managing a buffer.

A processor may receive, from a host, a write command with respect to a first flash page among one or more pages in a flash memory (410). The processor may determine whether a buffer hit occurs with respect to the first flash page, indicating whether data of the first flash page exists in a buffer memory.

When the buffer hit occurs, the processor may write on a first buffer page that performs buffering the data of the first flash page, new data from the first flash page (450).

The processor updates an arrangement sequence of a buffer queue (460). For example, the processor updates the first buffer page to be the most recently accessed buffer page. As a result, the first buffer page may be dequeued last.

When the processor determines a buffer hit does not occur, (i.e., when a buffer miss occurs), the processor determines whether an empty buffer page exists in the buffer memory (420).

When one or more empty buffer page exist, the processor may assign a second buffer page that is one of the empty buffer pages (440). The processor may write data of the first flash page on the second buffer page that is empty (450). The processor may inqueue the second buffer page to a buffer queue corresponding to the first flash page (460). For example, the processor may arrange the second buffer page as the most recently accessed buffer page.

When the processor determines an empty buffer page does not exist in the buffer memory, or the number of empty buffer pages is less than or equal to a first threshold, the processor may dequeue a tail page from each buffer queue in the buffer memory. The processor may program in parallel the dequeued tail pages to the flash memory. In this example, the number of generated empty buffers equals a number of buffer queues excluding buffer queues without any inqueued buffer pages.

When an empty page is generated, the processor may assign a new page for buffering data of the first flash page (440), the processor may write data of the first flash page to the assigned page (450), and the processor may update a buffer queue corresponding to the data of the first flash page (460).

Figure 5:
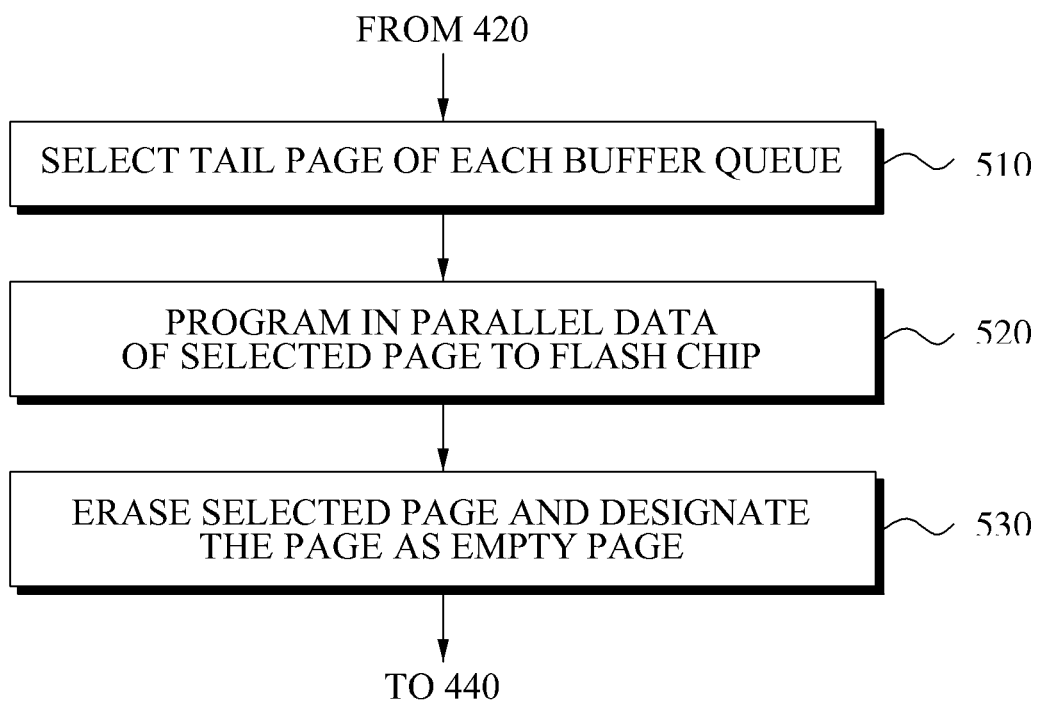
FIG. 5 illustrates an example of a method of performing parallel buffer flushing.

FIG. 5 illustrates an example of performing parallel buffer flushing shown in FIG. 4.

A tail page of each of a plurality of buffer queues in a buffer memory may be selected (510). When the buffer is managed based on an LRU scheme, the tail page is the least recently accessed page in the buffer queue.

The data stored in each selected tail page may be programmed in parallel to a flash chip of a flash memory (520). Examples of programming in parallel operation have been described with reference to FIGS. 2 and 3, and thus are not repeated here for conciseness.

The processor may erase each selected tail page and may designate the erased page as an empty page (530). Subsequently, new buffer data may be written on the buffer page designated as the empty page.

The examples described herein may be used to improve buffer memory and system performance. For example, partial data may be stored in the buffer memory and the main memory to free space in a flash memory when the volume of the free space is not great in the buffer memory.

The method according to the above-described example embodiments may be recorded in computer-readable storage media including program instructions to implement various operations embodied by a computer. The media may also include, alone or in combination with the program instructions, data files, data structures, and the like. Examples of computer-readable media include magnetic media, such as hard disks, floppy disks, and magnetic tape; optical media, such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described examples, or vice versa. In addition, a computer-readable storage medium may be distributed among computer systems connected through a network and computer-readable codes or program instructions may be stored and executed in a decentralized manner.

Flash memory devices and/or memory controllers according to examples provided herein may be implemented using various types of packages. For example, the flash memory devices and/or memory controllers may be implemented using packages such as Package on Packages (PoPs), Ball Grid Arrays (BGAs), Chip Scale Packages (CSPs), Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Plastic Metric Quad Flat Pack (MQFP), Thin Quad Flatpack (TQFP), Small Outline Integrated Circuit (SOIC), Shrink Small Outline Package (SSOP), Thin Small Outline (TSOP), System In Package (SIP), Multi Chip Package (MCP), Wafer-level Fabricated Package (WFP), Wafer-Level Processed Stack Package (WSP), and the like.

The flash memory devices and/or the memory controllers also may constitute memory cards. In this example, the memory controllers may be constructed to communicate with an external device, for example, a host using any one of various types of protocols, such as a USB, a Multi Media Card (MMC), a Peripheral Component Interconnect-Express (PCI-E), Serial Advanced Technology Attachment (SATA), Parallel ATA (PATA), Small Computer System Interface (SCSI), Enhanced Small Device Interface (ESDI), and Integrated Drive Electronics (IDE).

The flash memory devices may be non-volatile memory devices that can maintain stored data even when power is not supplied. According to an increase in the use of mobile devices, such as a cellular phone, a personal digital assistant (PDA), a digital camera, a portable game console, and an MP3 player, the flash memory devices may be more widely used as data storage and code storage. The flash memory devices may be used in home applications, such as a high definition television (HDTV), a digital video disk (DVD), a router, and a Global Positioning System (GPS).

A computing system or a computer may include one or more processing devices, microprocessors, or microcomputers that are electrically connected with one or more of a bus, a user interface, a modem, such as a baseband chipset, a memory controller, and a flash memory device. The flash memory device may store N-bit data via the memory controller. The N-bit data is processed or will be processed by the microprocessor and N may be 1 or an integer greater than 1. When the computing system is a mobile apparatus, a battery or other power source may be additionally provided to supply at least the operation voltage of the computing system.

It will be apparent to those of ordinary skill in the art that the computing system according to example embodiments may further include an application chipset, a camera image processor (CIS), a mobile Dynamic Random Access Memory (DRAM), and the like. The memory controller and the flash memory device may constitute an SSD that uses a non-volatile memory to store data.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A storage device, comprising:
a buffer memory having N queues configured in parallel, each queue configured to store pages of data;
a flash memory having N flash chips configured in parallel;
a channel configured to concurrently convey a page of data from each of the N queues to a different one of the N flash chips; and
a processor configured to concurrently program, during a programming operation, a page of data from each of the N queues to a different one of the N flash chips, via the channel, wherein:
during each programming operation, the processor concurrently programs a page of data from each of the N queues that has a page of data inqueued to a different one of the N flash chips but does not so program a page of data from any of the N queues that does not have a page of data inqueued, and
N is a natural number greater than 1.

2. The storage device of claim 1, wherein the processor programs the N pages of data when the number of empty pages in the buffer memory is less than or equal to a first threshold.

3. The storage device of claim 1, wherein the processor erases the N pages of data from the buffer memory after programming the N pages of data to the flash memory.

4. The storage device of claim 1, wherein each of the N pages of data among the pages of data in the buffer memory is associated with a different one of N buffer queues.

5. The storage device of claim 4, wherein the processor selects a page of data associated with each of the N buffer queues and programs the selected N pages of data to the flash memory, when the number of empty pages in the buffer memory is less than or equal to a first threshold.

6. The storage device of claim 5, wherein the selected page for each of the N buffer queues is selected from a plurality of pages of data associated with the buffer queue, based on a least recently used (LRU) scheme.

7. A storage device, comprising:
a buffer memory having N buffer queues, where N is a natural number greater than 2;
a flash memory having multiple flash chips; and
a processor that selects a page of data from each of M, M a natural number less than N, of the N buffer queues and programs the data stored in the selected pages to the flash memory, wherein:
the data of each selected page is concurrently programmed to a different one of the multiple flash chips by the processor, and
for each selection of data pages from M buffer queues, each of the M buffer queues from which a page of data is selected has a page of data inqueued and each of the N-M buffer queues from which a page of data is not selected does not have a page of data inqueued.

8. The storage device of claim 7, wherein the number of buffer queues is determined according to a number of channels used to concurrently program data in the flash memory.

9. The storage device of claim 7, wherein the processor selects the pages of data and programs the data stored in the selected pages to the multiple flash chips when the number of empty pages in the buffer memory is less than or equal to a first threshold.

10. The storage device of claim 9, wherein, for each selected page of data, the processor selects the page of data from multiple pages of data associated with the queue, based on least recently used (LRU) scheme.

11. A method of managing a buffer, the method comprising:
selecting a page of data from each of fewer than all of a plurality of buffer queues in the buffer;
transmitting data stored in the selected pages to a flash memory that has multiple flash chips; and
concurrently programming transmitted data from each of the selected pages to a different one of the flash chips, wherein
for each selection of data pages from fewer than all buffer queues, each of the buffer queues from which a page of data is selected has a page of data inqueued and each of the buffer queues from which a page of data is not selected does not have a page of data inqueued.

12. The method of claim 11, further comprising erasing data, from the associated queue, that is stored in each of the selected pages.

13. The method of claim 12, further comprising:
writing data corresponding to a received write command on the pages where the data has been erased; and
allocating any one of the erased pages to one of the plurality of buffer queues.

14. The method of claim 13, further comprising updating a sequence of pages associated with the one buffer queue.

15. A non-transitory computer readable recording medium storing a program including instructions, the program when executed causes a computer to:
select a page of data from each of fewer than all of a plurality of buffer queues in a buffer;
transmit data stored in the selected pages to a flash memory that has multiple flash chips; and
concurrently programming transmitted data from each of the selected pages to a different one of the flash chips, wherein
for each selection of data pages from fewer than all buffer queues, each of the buffer queues from which a page of data is selected has a page of data inqueued and each of the buffer queues from which a page of data is not selected does not have a page of data inqueued.

* * * * *